United States Patent [19]
Plume

[11] 3,871,041
[45] Mar. 18, 1975

[54] UPHOLSTERY ATTACHMENT HARDWARE

[75] Inventor: Robert W. Plume, Sterling Heights, Mich.

[73] Assignee: Travel Products, Inc., Washington, Mich.

[22] Filed: Oct. 4, 1973

[21] Appl. No.: 403,686

[52] U.S. Cl. ................................ 5/353.1, 297/219
[51] Int. Cl. ............................................ A47c 23/00
[58] Field of Search ................... 297/218, 219, 229; 5/353.1, 353.2; 52/716, 717, 718

[56] References Cited
UNITED STATES PATENTS

| | | | |
|---|---|---|---|
| 2,760,562 | 8/1956 | Fisher | 5/353.1 |
| 3,201,909 | 8/1965 | Gorun | 52/717 |
| 3,506,987 | 4/1970 | Bielak | 297/218 |
| 3,552,708 | 1/1971 | Hillstrom | 52/718 |
| 3,647,260 | 3/1972 | Grant et al. | 297/219 |

Primary Examiner—James T. McCall
Assistant Examiner—Darrell Marquette
Attorney, Agent, or Firm—Reising, Ethington & Perry

[57] ABSTRACT

Upholstery is removably secured to furniture or to vehicle seats by the upholstery attachment hardware of thnis invention. An elongated vinyl strip designed for mating engagement with a keeper strip attached to the article to which the uphostery is to be applied is sewn to the upholstery. The vinyl strip includes an interlock groove formed by a front molding and an integral interlock finger which groove is adapted to receive the keeper strip. When the upholstery is put on the article to be covered it is stretched and the vinyl strip is interlocked with the keeper strip to secure the upholstery in place. The interlock finger includes a beveled surface to facilitate insertion of the keeper strip into the interlock groove. The attachment hardware also includes first and second locating fingers to provide positive location of the front molding, thus yielding a finished appearance and reducing free play of the vinyl strip when in position.

6 Claims, 2 Drawing Figures

PATENTED MAR 18 1975  3,871,041

UPHOLSTERY ATTACHMENT HARDWARE

BACKGROUND OF THE INVENTION

1. FIELD OF THE INVENTION

This invention relates to upholstery attachment hardware for use in removably securing upholstery to furniture or vehicle seats.

2. DESCRIPTION OF THE PRIOR ART

Various devices for removably attaching upholstery or seat covers are known in the prior art. These known attachment designs include mating interlock members carried respectively by the upholstery or seat covers and the seat members or frames. These prior art designs are typified by the U.S. Pat. Nos. to Wilfert 3,102,755, Cauvin 3,233,353 and Grant et al 3,647,260.

SUMMARY OF THE INVENTION

In the present invention upholstery attachment hardware is attached to upholstery material or seat covers. This attachment hardware is fabricated from vinyl and is preferably sewn to the upholstery or seat cover. The design of the attachment hardware provides an interlock groove formed by a front molding and an interlock finger formed integral with the front molding. A keeper strip is attached to the article to which the upholstery or seat cover is to be applied. When the upholstery or seat cover is put on it is stretched over the article to be covered and the keeper strip is inserted into the interlock groove to retain the upholstery or seat cover in place. The interlock finger includes a beveled surface to facilitate insertion of the keeper strip into the interlock groove. The attachment hardware also includes first and second locating fingers to provide positive location of the front molding relative to the article being upholstered and to reduce the play between the attachment hardward and the keeper strip.

DESCRIPTION OF THE DRAWINGS

The instant invention can be best understood by reference to the following description of a preferred embodiment taken in conjunction with the accompanying drawings in which.

DESCRIPTION OF THE PREFERRED EMBODIMENT

Figure 1:
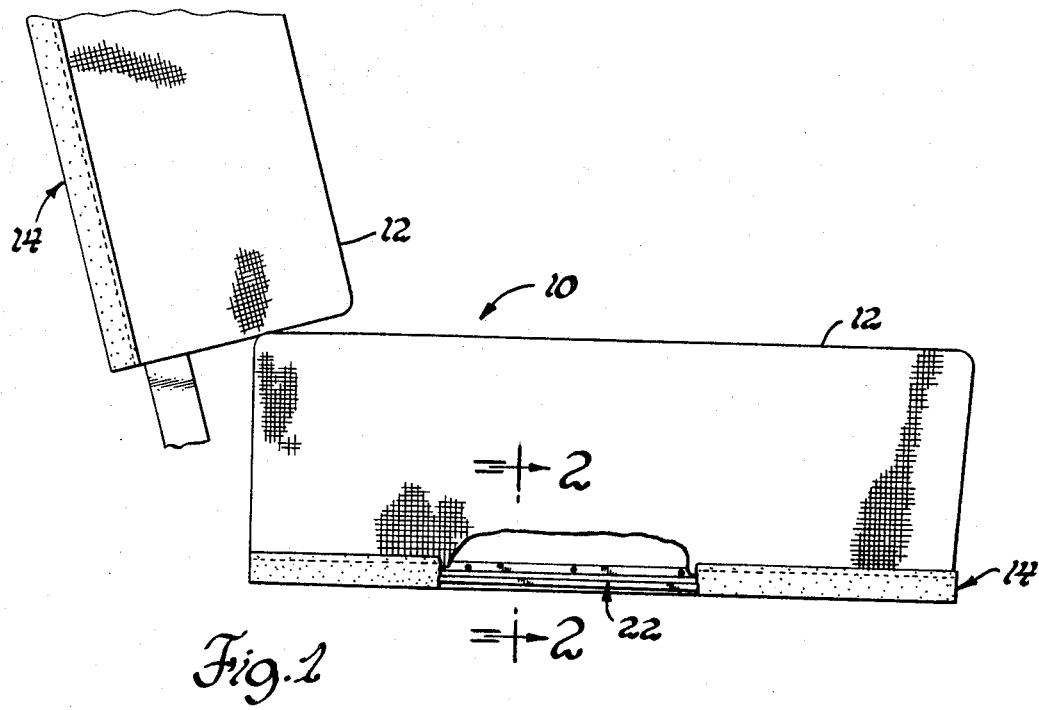
FIG. 1 is a side view of a vehicle seat having upholstery secured thereto by the attachment hardware of the present invention.

Reference should now be made to the drawings and more particularly to FIG. 1 wherein a vehicle seat generally designated 10 is shown fitted with upholstery 12 secured to the seat by upholstery attachment hardware 14 made in accordance with the present invention. The vehicle seat 10 is of the type wherein the seat back can be pivoted into substantial alignment with the seat bottom to form a bed, for example, for use in a recreational vehicle. For purposes of the present invention, however, the configuration of the seat or other article to be upholstered is not of significance; the seat 10 forms no part of the present invention, rather it merely illustrates one use for the upholstery attachment hardware 14.

Figure 2:
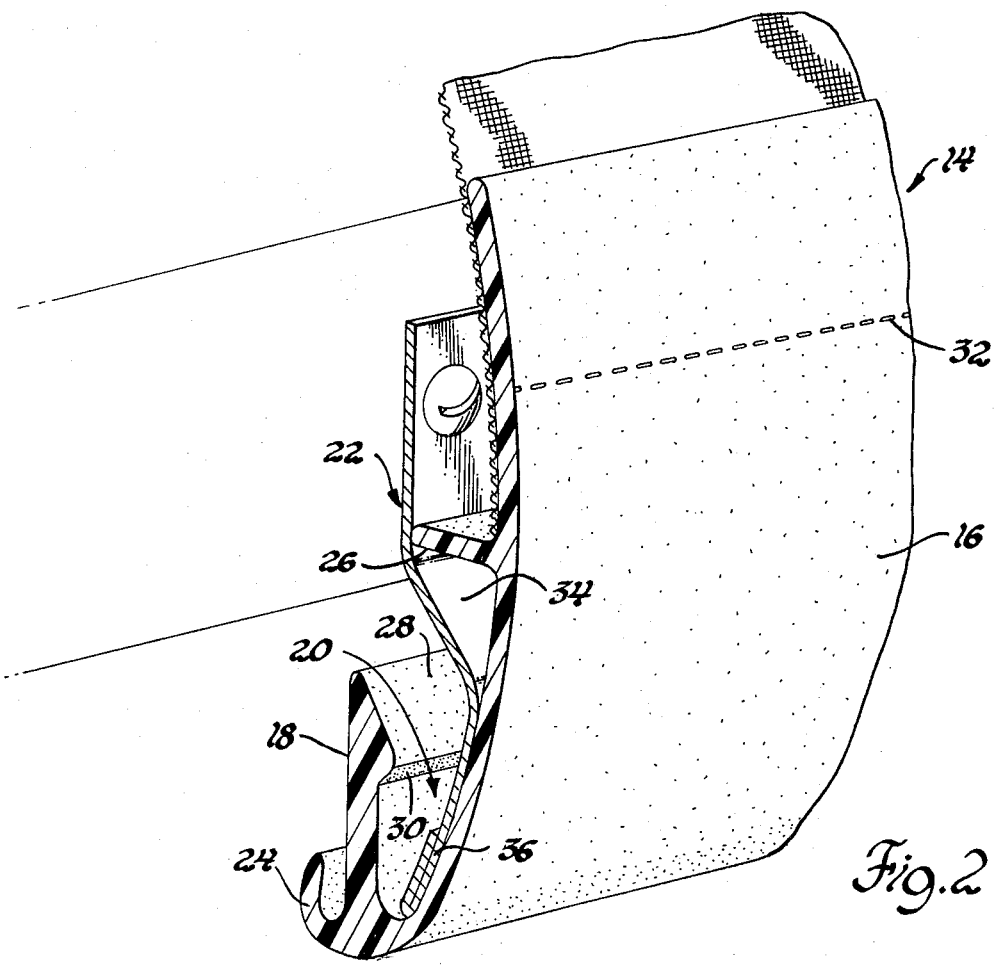
FIG. 2 is an enlarged partial sectional view of the upholstery attachment hardware of the present invention together with a portion of the upholstery to be attached and the keeper strip which mates with the upholstery attachment hardware.

As best illustrated in FIG. 2, the upholstery attachment hardware 14 includes a front molding 16 and an interlock finger 18 formed integral with the front molding 16. The front molding 16 and the interlock finger 18 form an interlock groove generally designated 20 which groove is adapted to receive a keeper strip 22. As shown in FIG. 1, the keeper strip 22 is attached to the article to be upholstered, i.e., the vehicle seat in the drawing. A locating finger 24 is disposed in a confronting relation to the interlock finger 18 on the side of the interlock finger 18 opposite the front molding 16. The locating finger 24 engages the vehicle seat, as illustrated in FIG. 1, to space the front molding 16 relative to the vehicle seat. A second locating finger 26 engages the keeper strip 22 to position the front molding 16. This second locating finger 26 is disposed on the reverse face of the front molding 16. The interlock finger 18 is provided with a beveled surface 28 to facilitate insertion of the keeper strip 22 into the interlock groove 20. A second beveled surface 30 on the interlock finger 18 assists in securing the keeper strip 22 once it is inserted into the groove 20.

The upholstery attachment hardware 14 is preferably fabricated from vinyl, or some other material having suitable flexibility. In the preferred embodiment the upholstery material is sewn to the elongated vinyl strip along the line of stitching 32.

As is best illustrated in FIG. 2, the keeper strip 22 includes a section 34 providing an offset for the keeper strip 22 so that the bottom portion 36 of the keeper strip is spaced from the vehicle seat. When the seat covers are put on the vehicle seat the attachment hardware 14 is mated with the keeper strip 22 by stretching the upholstery fabric to permit the interlock finger 18 to pass over the end section 36 of the keeper strip 22 such that the keeper strip can be seated in the interlock groove 20. The bevel 28 of the interlock finger 18 provides a sloped entry surface to facilitate this engagement. Once the keeper strip 22 is inserted in the interlock groove 20 the fabric provides sufficient tension to insure continued engagement. The beveled surface 30 serves to assist in retaining the keeper strip 22 in the interlock groove 20.

When the upholstery material is in place, the locating fingers 24 and 26 position the front molding 16 with a predetermined spacing relative to the seat or seat frame. This spacing provides a finished appearance for the upholstery attachment hardware. Additionally, these locating fingers 24 and 26 limit movement by the front molding 16 to thereby produce a rigid assembly.

Although the foregoing has proceeded in terms of a particular preferred embodiment, it is to be understood that various modifications and changes could be engrafted thereon by one skilled in the art within the spirit and scope of the apended claims.

The embodiments of the invention in which an exclusive property or privilege is claimed are defined as follows:

1. Upholstery attachment hardware for mating engagement with a keeper strip attached to the article to which upholstery is to be applied comprising: a front molding; an interlock finger formed integral with said front molding, said interlock finger and said front molding forming an interlock groove adapted to receive said keeper strip attached to the article to which the upholstery is to be applied; and a locating finger disposed in a confronting relation with said interlock finger on the side of said interlock finger opposite said front molding, said locating finger being adapted to engage the article to which the upholstery is to be applied to provide a predetermined spacing of said front molding relative to the article to which the upholstery is to be applied.

2. Upholstery attachment hardware as in claim 1 wherein said interlock finger includes a beveled surface adapted to facilitate insertion of said keeper strip into the interlock groove.

3. Upholstery attachment hardware as in claim 2 including a second locating finger disposed on the reverse face of said front molding, said second locating finger being adapted to engage said keeper strip to provide a predetermined spacing of said front molding relative to the article to which the upholstery is to be applied and being adapted to improve the interlock between said attachment hardware and said keeper strip inserted into the interlock groove.

4. Upholstery attachment hardware as in claim 3 fabricated from vinyl.

5. Upholstery attachment hardware as in claim 4 adapted to be sewn to upholstery material.

6. Upholstery attachment hardware for mating engagement with a keeper strip attached to the article to which the upholstery is to be applied comprising: a front molding; an interlock finger formed integral with said front molding, said interlocking finger and said front molding forming an interlock groove adapted to receive said keeper strip attached to the article to which the upholstery is to be applied; and first and second locating fingers adapted to provide predetermined spacing of said front molding relative to the article to which the upholstery is to be applied and adapted to improve the interlock between said attachment hardware and said keeper strip inserted into the interlock groove, said front molding and said interlock finger and first and second locating fingers being fabricated from vinyl and adapted to be sewn to upholstery material.

* * * * *